United States Patent
Zhang et al.

(10) Patent No.: US 9,948,184 B2
(45) Date of Patent: Apr. 17, 2018

(54) CURRENT BALANCE METHOD FOR MULTIPHASE SWITCHING REGULATORS

(71) Applicant: Avago Technologies General IP (Singapore) Pte. Ltd., Singapore (SG)

(72) Inventors: He Zhang, Singapore (SG); Jinghua Zhang, Singapore (SG); Yow Ching Cheng, Singapore (SG); Junle Pan, Singapore (SG); David Seng Poh Ho, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/073,484

(22) Filed: Mar. 17, 2016

(65) Prior Publication Data

US 2017/0229961 A1    Aug. 10, 2017

Related U.S. Application Data

(60) Provisional application No. 62/292,742, filed on Feb. 8, 2016.

(51) Int. Cl.
*G05F 1/00* (2006.01)
*H02M 3/158* (2006.01)

(52) U.S. Cl.
CPC .................... *H02M 3/158* (2013.01)

(58) Field of Classification Search
CPC ..... H02M 3/156; H02M 3/158; H02M 3/1584
USPC .......................... 323/242, 282, 285, 288, 326
See application file for complete search history.

(56) References Cited

U.S. PATENT DOCUMENTS

| | | | | |
|---|---|---|---|---|
| 6,292,378 B1* | 9/2001 | Brooks | ............... | H02M 3/1584 323/272 |
| 2003/0218893 A1* | 11/2003 | Tai | ...... | H02M 3/1584 363/65 |
| 2005/0007083 A1* | 1/2005 | Yang | .................. | H02M 1/4225 323/282 |
| 2009/0230932 A1* | 9/2009 | Wang | ................. | H02M 3/1584 323/234 |
| 2010/0033154 A1* | 2/2010 | Cheng | ................ | H02M 3/1584 323/293 |
| 2013/0293207 A1* | 11/2013 | Wei | .......................... | G05F 1/46 323/272 |
| 2014/0197810 A1* | 7/2014 | Huang | .................... | G05F 1/468 323/272 |

(Continued)

OTHER PUBLICATIONS

Huang et al., A 100 MHz 82.4% Efficiency Package-Bondwire Based Four-Phase Fully-Integrated Buck Converter with Flying Capacitor for Area Reduction, IEEE Journal of Solid-State Circuits, vol. 48, No. 12, Dec. 2013, 12 pages.

(Continued)

*Primary Examiner* — Alex Torres-Rivera
(74) *Attorney, Agent, or Firm* — Foley & Lardner LLP

(57) ABSTRACT

A regulator circuit includes a multiphase ramp generator circuit, an amplifier circuit configured to receive a plurality of phase sense signals and provide a plurality of respective error signals, and an adder circuit configured to receive the error signals and ramp generator signals. The ramp generator signals are received from the multiphase ramp generator circuit and the adder circuit is configured to provide a plurality of respective adjusted ramp generator signals. The regulator can be a multiphase switching regulator circuit.

20 Claims, 4 Drawing Sheets

(56) References Cited

U.S. PATENT DOCUMENTS

2015/0285843 A1* 10/2015 Michal .................. H02M 3/156
  324/713

OTHER PUBLICATIONS

Intersil, 4-Phase Interleaved Boost PWM Controller with Light Load Efficiency Enhancement, Datasheet ISL78225, Sep. 5, 2014, 22 pages.
Intersil, A Mobile Multi-Phase PWM Controller with Precision Current Sensing, Datasheet ISL6247, Jun. 2003, 28 pages.
Lee et al., A Monolithic Current-Mode CMOS DC-DC Converter with On-Chip Current-Sensing Technique, IEEE Journal of Solid-State Circuits, vol. 39, No. 1, Jan. 2004, 12 pages.
Linear Technology, Dual, Multiphase Step-Down Voltage Mode DC/DC Controller with Accurate Current Sharing, Datasheet LTC3861, 2012, 38 pages.
Linear Technology, Dual, Multiphase Step-Down Voltage Mode DC/DC Controller with Current Sharing, Datasheet LTC3860, 2010, 36 pages.
Maxim, Single/Multiphase, Step-Down, DC-DC Converter Delivers up to 25A per Phase, Datasheet MAX8686, 2010, 23 pages.

* cited by examiner

CURRENT BALANCE METHOD FOR MULTIPHASE SWITCHING REGULATORS

CROSS-REFERENCE TO RELATED APPLICATIONS

This application claims the benefit of and priority to U.S. Provisional Application No. 62/292,742, entitled, "CURRENT BALANCE METHOD FOR MULTIPHASE SWITCHING REGULATORS," filed on Feb. 8, 2016, which is hereby incorporated by reference herein in its entirety.

BACKGROUND OF THE DISCLOSURE

In the last few decades, the market for wireless communication, sensing, storage and computing devices has grown by orders of magnitude, fueled by the use of portable devices, and increased connectivity and data transfer between all manners of devices. Furthermore, digital and radio frequency (RF) circuit fabrication improvements, as well as advances in circuit integration and other aspects have made electronic equipment smaller, cheaper, and more reliable. Electronic circuits associated with communication, sensing, storage, and computing devices as well as other electronic devices can utilize switching regulators to provide power to devices on integrated circuits.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
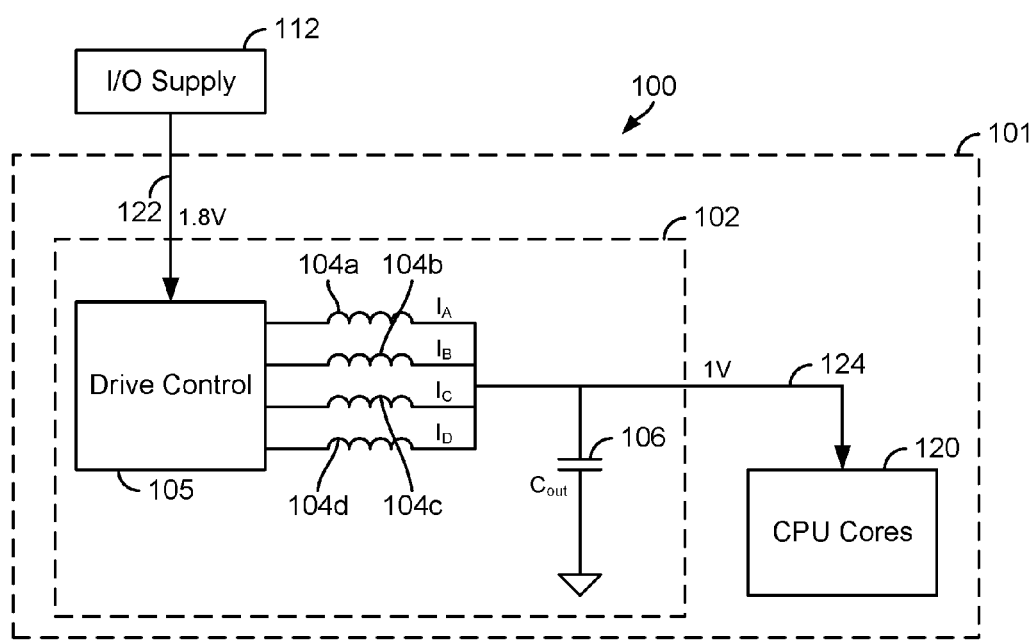
FIG. 1 is a schematic general block diagram of a circuit including a switching regulator in accordance with some embodiments.

Described herein with reference to FIGS. 1-5 are systems and methods for providing a signal at a voltage level, such as a power source level. Such systems and methods can be used in virtually any application that uses or can benefit from a power signal. Applications include but are not limited to communication, sensing, computing, storing or other electronic applications. In certain embodiments, the systems and methods described herein can be utilized in circuitry for any communication, sensing, storing, or computing device In some embodiments, integrated circuits (ICs) include one or more switching regulators for providing power to core circuitry. The power is provided at a desired voltage level. The switching regulators provide current at two or more phases or output stages. The output stages or phases each include an inductor through which the switching regulator provides the current for each stage or phase. Mismatches in current through the inductors of the phases or stages lead to reliability issues and degrade efficiency. For example, current mismatches can cause conduction losses (e.g., a 50% current mismatch can result in an efficiency drop of 1.25 percent in some implementations).

In some embodiments, the switching regulator is a high accuracy, low power multiphase current balanced switching regulator that senses current at each phase and adjusts the current in each phase to reduce mismatch errors. In some embodiments, a multiphase switching regulator architecture achieves high or increased sense accuracy and low or reduced power consumption which improves reliability and power efficiency. The multiphase switching regulator architecture provides advantages for products that benefit from highly balanced current and high efficiency in the multiphase switching regulator in some embodiments. In some embodiments, a multiphase switching regulator uses a current balancing operation that generates an output stage voltage replica signal for each of two or more phases (e.g., 4 phases) and low pass filters each of the output stage voltage replica signals to provide respective filtered sense signals. The filtered sense signals are representatives of the average voltages across the output drivers and inductors in output stages. In some embodiments, one of the filtered sense signals is used as a master signal (e.g., reference) for comparison with other filtered sense signals (slave phase signals) and the difference is provided by an error amplifier circuit as an error signal. The error signal from the error amplifier circuit is used to tune a common mode voltage signal, which is added to a periodic voltage ramp signal through AC coupling in some embodiments. The adjusted periodic voltage ramp signal is used to control the current provided in each stage in some embodiments. In some embodiments, a low power adder outside of the main control loop provides the common mode voltage without adding a pole into the main control loop.

In some embodiments, a switching regulator includes a set of drivers configured to provide a set of phase currents, a ramp generator circuit, and an adder configured to receive a set of error signals associated with the set of the phase currents. The adder is also configured to receive a ramp generator signal from the ramp generator circuit and provide a set of adjusted ramp generator signals. The switching regulator also includes a set of pulse width modulators configured to receive the set of adjusted ramp generator signals and provide a set of control signals to the set of the drivers.

In some embodiments, a multiphase switching regulator circuit includes a multiphase ramp generator circuit, and an amplifier circuit configured to receive phase sense signals and provide respective error signals. The multiphase ramp generator circuit is configured to receive the error signals and provide respective adjusted ramp generator signals.

In some embodiments, a method provides a power signal. The method includes providing a set of phase currents through a set of output stage inductive elements, and providing a set of low pass filtered sense signals associated with the set of phase currents. The method also includes providing a set of error signals in response to the set of low pass filtered sense signals, and using the set of error signals to adjust a set of pulse width modulated signals provided by a set of pulse width modulators driving a set of drive circuits associated with the set of phase currents.

With reference to FIG. 1, a system 100 includes a circuit 101. System 100 can be any type of electronic system or device including a communication, computing, sensing, storage or other device. Circuit 101 can be any part of system 100. In some embodiments, circuit 101 is part of or associated with an integrated circuit (IC) having core circuitry 120 such as one or more central processing unit (CPU) cores. In some embodiments, system 100 includes a power supply 112 (e.g., a battery, a power converter, etc.) and core circuitry 120 is complementary metal oxide processing (CMOS) processing and/or storage circuitry.

In some embodiments, circuit 101 includes a regulator circuit 102. Regulator circuit 102 includes a drive and control circuit 105, a set of inductors 104a-d, and a capacitor 106. Regulator circuit 102 is a multiphase (e.g, 2 or more phase) switching circuit that can provide accurately matched current levels through inductors 104a-d associated with each phase for a low power solutions in some embodiments. In some embodiments, regulator circuit 102 is suitable for all kinds of multiphase switching regulators. In one example, regulator circuit 102 can be configured as a multiphase fully integrated switching regulator (FISR).

In some embodiments, regulator circuit 102 receives a direct current (DC) power signal at 1.8 Volts (V) at an input 122 from power supply 112 or another source. In some embodiments, regulator circuit 102 provides a 1 V DC voltage signal at an output 124. The signal at the output 124 is provided to core circuitry 120 or to other circuitry in some embodiments. Capacitor 106 is disposed between output 124 and ground and can be one or more storage capacitors having a capacitance rating in accordance with output criteria for regulator circuit 102 in some embodiments. The voltage levels discussed above are exemplary only; other voltage levels can be utilized.

Regulator circuit 102 provides current $I_A$, $I_B$, $I_C$, and $I_D$ through respective inductors 104a-d. The amount of current provided through inductors $I_A$, $I_B$, $I_C$, and $I_D$ is controlled by drive and control circuit 105. Mismatches in currents $I_A$, $I_B$, $I_C$, and $I_D$ can lead to reliability issues and degrade efficiency. Although four phases are illustrated in FIG. 1, any number of phases can be utilized in regulator circuit 102.

In some embodiments, drive and control circuit 105 is an integrated circuit including circuitry configured to perform operations as discussed below. Drive and control circuit 105 of regulator circuit 102 uses feedback to adjust drive signals associated with the currents $I_A$, $I_B$, $I_C$, and $I_D$ to reduce mismatch. The feedback is achieved by providing replica signals associated with the currents $I_A$, $I_B$, $I_C$, and $I_D$ and comparing the replica signals to each other to make adjustments to the drive signals using an adder outside of the main control loop. In some embodiments, regulator circuit 102 does not directly sense the output stage current by using current mirror, does not sense the average voltage across the inductor in each phase, and does not sense the average voltage across an additional series resistor, thereby increasing accuracy and reducing power consumption. For a high switching frequency switching regulator, directly sensing the output stage current by using a current mirror requires a high bandwidth to sense the current accurately which translates to high power consumption in some embodiments. Sensing the average voltage across inductors 104a-d depends upon the accurate matching of equivalent series resistance (ESR) of each inductor 104a-d which may be quite poor in some embodiments. Sensing the voltage across a series resistor requires an additional component that consumes power and degrades switching regulator efficiency in some embodiments. In some embodiments, an adder is not used in the main loop control path of the switching regulator to make the adjustment because such an adder provides at least one more pole and affects the main loop control path stability.

Figure 2:
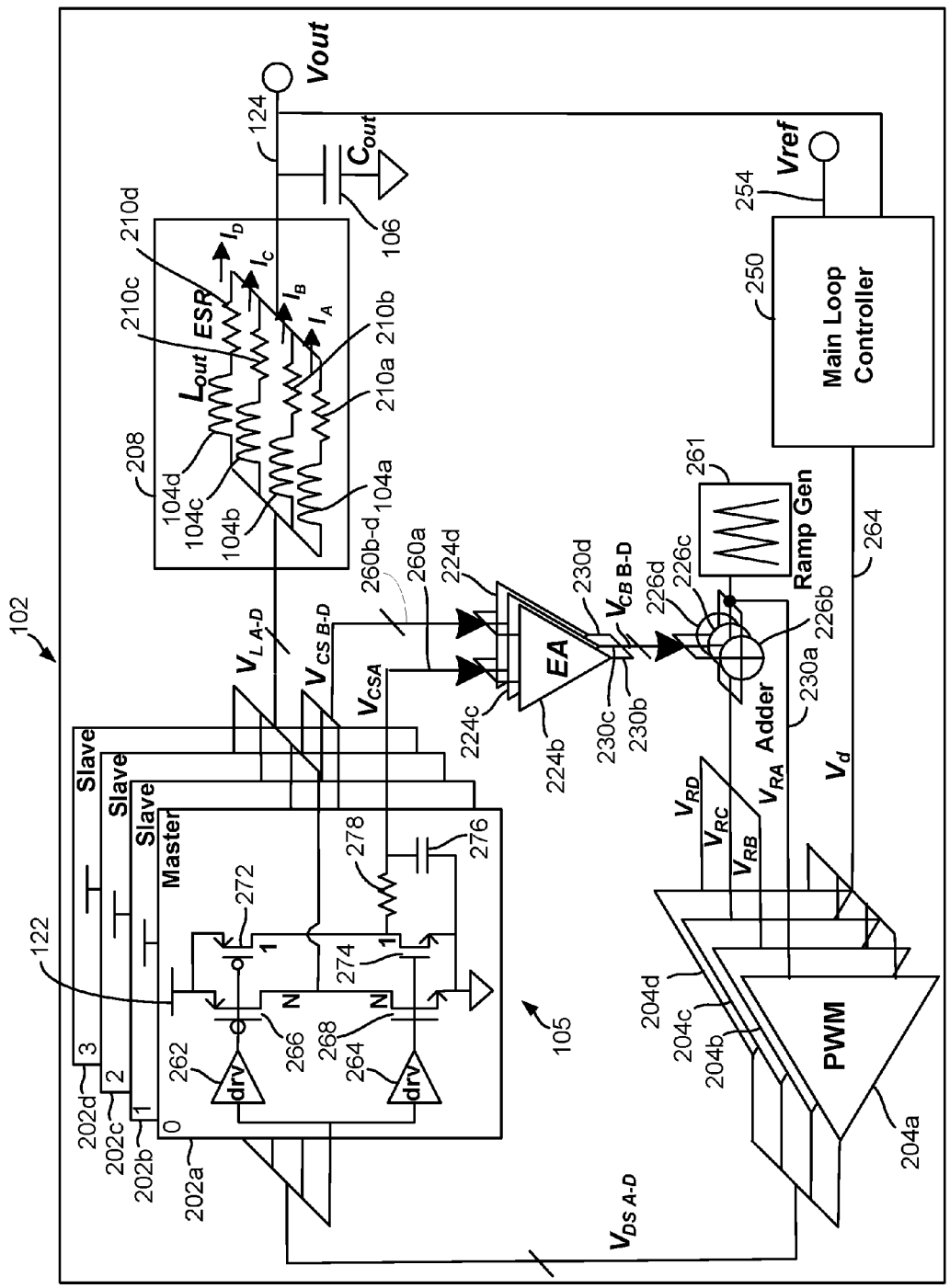
FIG. 2 is an electrical schematic diagram of the switching regulator illustrated in FIG. 1 in accordance with some embodiments.

With reference to FIG. 2, regulator circuit 102 includes capacitor 106, drive and control circuit 105 and a set of output stage inductors 208. Drive and control circuit 105 includes drive circuits 202a-d, pulse width modulator circuits 204a-d, error amplifier circuits 224b-d, adder circuits 226b-d, a main loop controller 250, and a ramp generator 261 in some embodiments. In some embodiments, capacitor 106 and/or set of output stage inductors 208 are discrete components and are not integrated with drive and control circuit 105. In some embodiments, regulator circuit 102 is provided in a single integrated circuit package and is integrated with other circuits.

Ramp generator 261 is a clock signal generator including a capacitive/resistive network for generating a ramp signal $V_{RA}$ in some embodiments. The ramp signal $V_{RA}$ is a saw tooth wave signal or other time varying signal in some embodiments. Set of output stage inductors 208 includes inductors 104a-d and resistors 210a-d which represent equivalent series resistance in some embodiments. Set of output stage inductors 208 includes 2 or more (e.g., four) phases or stages in some embodiments.

Drive circuits 202a-d of drive and control circuit 105 provide respective voltage signals $V_{LA-D}$ so that currents $I_A$, $I_B$, $I_C$, and $I_D$ are provided through inductors 104a-d in some embodiments. The voltage signals $V_{LA-D}$ are respectively provided by drive circuits 202a-d in response to respective pulse width modulated signals $V_{DSA-D}$ provided by pulse width modulator circuits 204a-d in some embodiments. Drive circuits 202a-d each include drive buffers 262 and 264 that receive the pulse width modulated signals $V_{DSA-D}$ and drive transistors 266 and 268 that provide the voltage signals $V_{LA-D}$. Transistors 266 and 268 are PMOS and NMOS transistors, respectively, having gates coupled to respective buffers 262 and 264 in some embodiments.

Main loop controller 250 provides a main control signal $V_d$. Each of pulse width modulator circuits 204a-d provide the appropriate drive signals $V_{DSA-D}$ to respective drive circuits 202a-d in response the main control signal $V_d$ and respective ramp signals $V_{RA-D}$ so that the appropriate amount of current $I_A$, $I_B$, $I_C$, and $I_D$ is provided for the demand level at output 124. The main loop controller 250 receives a reference voltage at an input 254 and a voltage at the output 124 for providing the main control signal $V_d$ to the pulse width modulator circuits 204a-d in accordance with a power demand algorithm in some embodiments. The main loop controller 250 includes an amplifier for monitoring the output voltage at output 124 and providing the main control signal $V_d$ in some embodiments. The pulse width modulator circuits 204a-d are comparators that provide the pulse width modulated signals $V_{DSA-D}$ in response to the respective ramp signals $V_{RA-D}$ and the main control signal $V_d$ in some embodiments.

Regulator circuit 102 advantageously employs a balancing operation to reduce mismatch errors. Drive circuits 202a-d of regulator circuit 102 provide filtered replica signals $V_{CSA}$, $V_{CSB}$, $V_{CSC}$, and $V_{CSD}$ for each of the phase currents $I_A$, $I_B$, $I_C$, and $I_D$ associated with set of output stage inductors 208 to measure or sense errors for correcting mismatch errors. The filtered replica signals $V_{CSA}$, $V_{CSB}$, $V_{CSC}$, and $V_{CSD}$ are low pass filtered voltage signals provided by a respective pair of transistors 272 and 274 in drive circuits 202a-d in some embodiments. The filtered replica signals $V_{CSA}$, $V_{CSB}$, $V_{CSC}$, and $V_{CSD}$ are filtered by a capacitor 276 which is coupled to a resistor 278.

Error amplifier circuits 224b-d receive the filtered replica signals $V_{CSA}$, $V_{CSB}$, $V_{CSC}$, and $V_{CSD}$ and provide respective error signals $V_{CBB-D}$ to provides adjustments via adder circuits 226b-d to the pulse width modulated signals $V_{DSA-D}$ provided by the pulse width modulator circuits 204a-d. Error signals $V_{CBB-D}$ are used to adjust the ramp signal $V_{RA}$. The ramp signals $V_{RB-D}$ are adjusted versions of the ramp signal $V_{RA}$ provided by the ramp generator 261 (e.g., adjusted by an offset of the respective error signals $V_{CBB-D}$) in some embodiments. The ramp signals $V_{RB-D}$ ensure that the pulse width modulated drive signals $V_{DSA-D}$ are provided so that the currents $I_A$, $I_B$, $I_C$, and $I_D$ are balanced in some embodiments. Pulse width modulator circuit 204a receives the ramp signal $V_{RA}$ without adjustment in some embodiments. Pulse width modulator circuits 204b-d receive the adjusted ramp signals $V_{RB-D}$ from respective adder circuits 226b-d in some embodiments. Error amplifier circuits 224b-d are operational amplifiers in some embodiments.

Adder circuits 226b-d are provided outside of the main control loop associated with main loop controller 250 in some embodiments. Adder circuits 226b-d are any circuit for combining or mixing signals in some embodiments.

Figure 3:
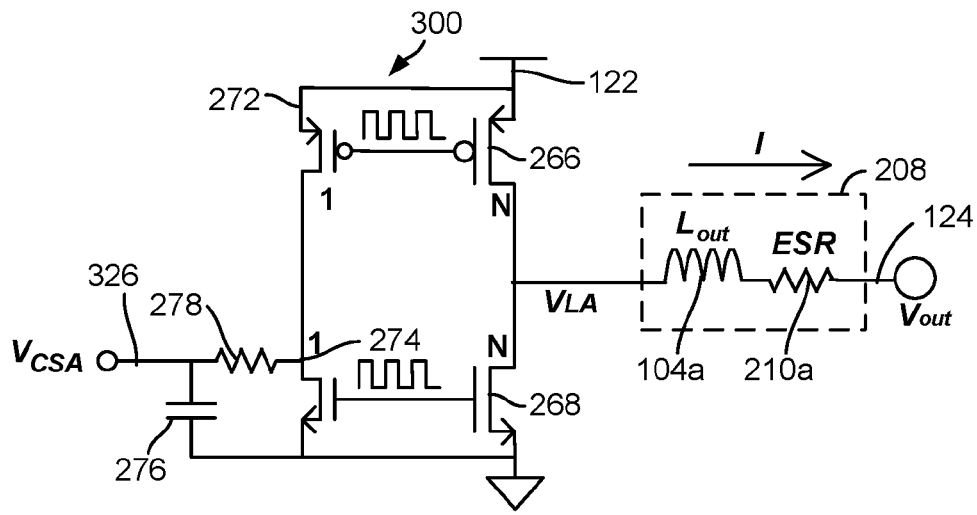
FIG. 3 is a more detailed electrical schematic diagram of a sense circuit for the switching regulator illustrated in FIG. 1 in accordance with some embodiments.

With reference to FIG. 3, a sense circuit 300 is associated with each of drive circuits 202a-d. Sense circuit 300 includes transistor 272 and transistor 274 in series with each other and parallel to transistors 266 and 268 of drive circuits 202a-d. Sense circuit 300 also includes resistor 278 and capacitor 276 in some embodiments.

Sense circuit 300 is described below for use with drive circuit 202a. Sense circuits for drive circuits 202b-d are similar or identical to sense circuit 300. Sense circuit 300 has an output 326 coupled to an input 260a of each of error amplifier circuits 224b-d (FIG. 2). Sense circuits for drive circuits 202b-d have respective outputs similar to output 326 coupled to respective inputs 260b-d (FIG. 2) of respective error amplifier circuits 224b-d. Error amplifier circuits 224b-d (FIG. 2) are configured to provide error signals $V_{CBB-D}$ indicative of the difference between the replica signal $V_{CSA}$ and each of the replica signals $V_{CSB-D}$ in some embodiments. The error signals $V_{CBB-D}$ are provided to each of adder circuits 226b-d, respectively, in some embodiments.

Transistors 272 and 274 are arranged as power stage replica having a 1:N ratio in some embodiments, where N is any number (e.g., N is 5, 10, 20, 100, 1000 depending on design criteria and power requirements). Transistors 266 and 268 are PMOS and NMOS transistors having gates coupled to respective drive buffers 262 and 264 in some embodiments. Transistors 272 and 274 are PMOS and NMOS transistors having gates coupled to respective drive buffers 262 and 264 in some embodiments.

Transistors 272 and 274 provide the replica signal associated with the inductor 104a driven by the voltage signal $V_{LA}$ provided between transistors 266 and 268. Capacitor 276 and resistor 278 low pass filters the replica signal to provide filtered replica signal $V_{CSA}$. Sense circuits for drive circuits 202b-d similarly provide replica signals associated with the inductors 104b-d and low pass filtered replica signals $V_{CSB-D}$.

In some embodiments, the filtered replica signal $V_{CSA}$=Vout (at output 124)+$I_A$*(ESR+Ron), where Ron is the on-resistance of the transistors 266 and 268 (e.g., power transistors). The error between two sensed voltages signals (e.g., $V_{CSA}$ and $V_{CSB}$) equals $\Delta V_{CS} = \Delta I$*(ESR+Ron) in some embodiments. Therefore, making $\Delta V_{CS}$=0 using the current mismatch control loop, advantageously makes $\Delta I$=0 in some embodiments.

Figure 4:
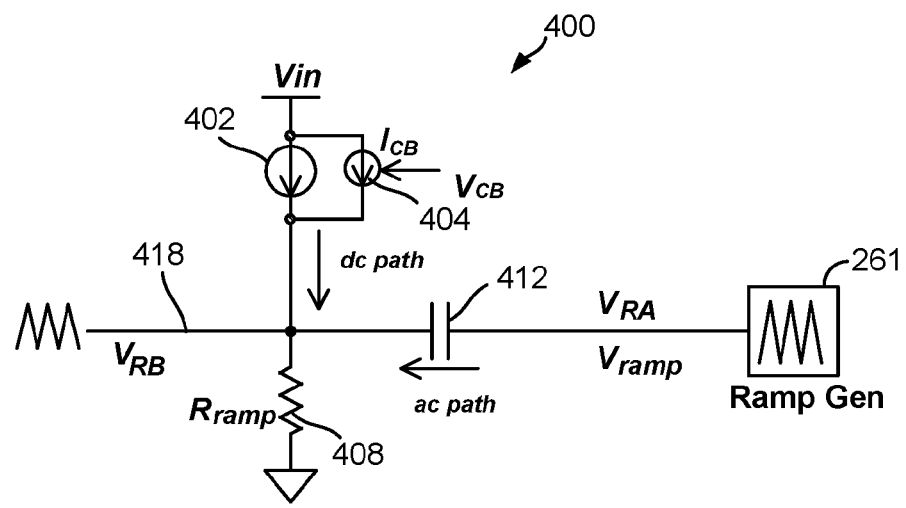
FIG. 4 is a more detailed electrical schematic diagram of a ramp signal adjustment circuit for the switching regulator illustrated in FIG. 1 in accordance with some embodiments.

With reference to FIG. 4, an adder circuit 400 can be used as any of adder circuits 226b-d in some embodiments. A separate adder circuit 400 is associated with each of error amplifier circuits 224b-d (FIG. 2) in some embodiments. Adder circuit 400 includes a current source 402, a current source 404, a ramp resistor 408, and a capacitor 412 in some embodiments. Capacitor 412 is coupled to ramp generator 261. Adder circuit 400 is discussed below as being adder circuit 226b.

Ramp generator 261 is configured to generate the ramp signal $V_{RA}$ (e.g., a saw tooth or other varying signal) for generating the pulse width modulated drive signals $V_{DSA-D}$ in some embodiments. Current sources 402 and 404 are NMOS or PMOS transistors in current source mode and coupled in parallel in some embodiments. In some embodiments, current source 404 is controlled by one of the error signals $V_{CBB-D}$. Adder circuit 400 provides an adjusted ramp signal $V_{RB}$ at an output 418 which can be any of adjusted ramp signals $V_{RB-D}$ (FIG. 2).

The adjusted ramp signals $V_{RB-D}$ are respectively provided to pulse width modulator circuits 204b-d (FIG. 2). Pulse width modulator circuit 204a receives the ramp signal $V_{RA}$ directly from the ramp generator 261 in some embodiments. Pulse width modulator circuits 204b-d are configured as comparators for providing the pulse width modulated drive signals $V_{DSB-D}$ to drive circuits 202b-d in response to the adjusted ramp signals $V_{RB-D}$ and the control signal $V_d$. Pulse width modulator circuit 204a is configured as a comparator for providing the pulse width modulated drive signal $V_{DSA}$ to drive circuit 202a in response to the ramp signal $V_{RA}$ from the ramp generator 261 and the control signal $V_d$.

In some embodiments, the operation of error amplifier circuits 224b-d and adder circuits 226b-d provides a current balancing loop to make $\Delta VCS$=0, i.e. $\Delta I$=0. In some embodiments, phase current is calibrated by tuning the common-mode of the ramp signal by using the current source 404 (FIG. 4). In some embodiments, a master phase signal (such as replica signal $V_{CSA}$) is compared to other slave phases (such as replica signal $V_{CSB-D}$) and the difference is amplified in error amplifier circuits 224b-d. The error signals $V_{CBB-D}$ are used to tune the common mode of ramp generator voltage through an AC coupling element (e.g., capacitor 412) in some embodiments. In some embodiments, adder circuits 226b-d are in the ramp signal path, and do not introduce an additional pole into the main loop. In some embodiments, a low speed (low-power) adder can be used for adder circuits 226b-d.

Figure 5:
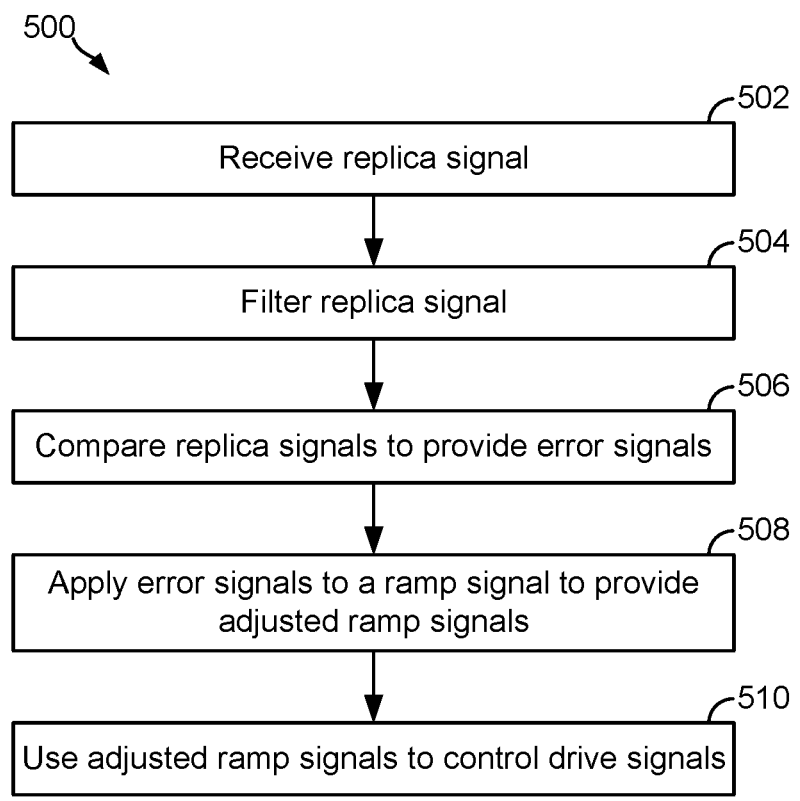
FIG. 5 is a flow diagram showing operation of the switching regulator illustrated in FIG. 1 in accordance with some embodiments.

Referring to FIG. 5, a flow 500 can be used by regulator circuit 102 for current balancing. At an operation 502, replica signals associated with the currents $I_A$, $I_B$, $I_C$, and $I_D$ are received and low pass filtered in an operation 504 to provide low pass filtered replica signals $V_{CSA-D}$. At an operation 506, one of the low pass filtered replica signals $V_{CSA-D}$ is compared to the other three low pass filtered replica signals $V_{CSA-D}$ to provide error signals $V_{CBB-D}$ indicative of the differences between the low pass filtered replica signals $V_{CSA-D}$. At an operation 508, error signals $V_{CBB-D}$ are applied to the ramp signal $V_{RA}$ to provide the adjusted voltage ramp signals $V_{RB-D}$. At an operation 510, the adjusted ramp signals $V_{RB-D}$ and the ramp signal $V_{RA}$ are used to provide the pulse wide modulated drive signals $V_{DSA-D}$.

It should be noted that certain passages of this disclosure use subscripts in connection with devices and signals for purposes of identifying or differentiating one from another or from others. These subscripts are not intended to relate entities temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either an integrated circuit or, in some embodiments, on multiple circuits, circuit boards or discrete components. In addition, the systems and methods described above can be adjusted for various system parameters and design criteria, such as output voltage level, power requirements, power supply levels, etc. Although shown in the drawings with certain components directly coupled to each other, direct coupling is not shown in a limiting fashion and is exemplarily shown. Alternative embodiments include circuits with indirect coupling between the components shown. Alternative embodiments can drive certain components with signals that are buffered, amplified, inverted, etc. with respect to the signals described herein.

While the foregoing written description of the methods and systems enables one of ordinary skill to make and use what is considered presently to be the best-mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A multiphase switching regulator circuit, comprising:
    an amplifier circuit configured to receive a set of replica signals and provide a plurality of error signals, wherein the plurality of error signals are provided exclusively by comparing a plurality of replica signals in the set of replica signals to a master replica signal in the set of replica signals; and
    a multiphase ramp generator circuit configured to receive the plurality of error signals and provide a plurality of respective adjusted ramp generator signals,
    wherein the multiphase ramp generator circuit comprises an adder circuit disposed outside of a main control loop, the adder circuit comprising a plurality of respective current sources configured to receive the plurality of error signals.

2. The multiphase switching regulator circuit of claim 1, further comprising:
    a pulse width modulator circuit configured to receive a main loop control signal and the adjusted ramp generator signals.

3. The multiphase switching regulator circuit of claim 1, wherein the replica signals are filtered replica signals associated with a plurality of respective output stages of the multiphase switching regulator circuit.

4. The multiphase switching regulator circuit of claim 3, further comprising:
    a drive circuit comprising a plurality of respective drive stages associated with the respective output stages; and
    a plurality of respective replica circuits associated with the respective drive stages.

5. The multiphase switching regulator circuit of claim 4, wherein the respective replica circuits are a scaled down copy of the respective drive stages that drive respective inductors, the respective replica circuits being scaled down in terms of transistor size, and the respective replica circuits driving a low pass filter.

6. The multiphase switching regulator circuit of claim 4, wherein the respective replica circuits are each comprised of a first transistor and a second transistor in series.

7. The multiphase switching regulator circuit of claim 1, wherein the adder circuit is disposed outside of the main control loop without introducing an additional pole into the main control loop.

8. The multiphase switching regulator circuit of claim 7, wherein the main control loop is associated with a main loop controller that provides a main control signal.

9. The multiphase switching regulator circuit of claim 1, wherein the set of the replica signals are provided by a set of scaled down replica drivers in parallel with a set of drivers coupled to a set of pulse width modulators.

10. A multiphase switching regulator circuit, comprising:
    a multiphase ramp generator circuit; and
    an amplifier circuit configured to receive a plurality of phase sense signals and provide a plurality of respective error signals, wherein the multiphase ramp generator circuit is configured to receive the respective error signals and provide a plurality of respective adjusted ramp generator signals,
    wherein the multiphase ramp generator circuit comprises an adder circuit, the adder circuit comprising a plurality of respective current sources configured to receive the respective error signals, and
    wherein the respective current sources are controlled by the respective error signals and each respective current source is used to provide respective common mode voltage signals, the common mode voltage signals being added to a ramp signal in the multiphase ramp generator circuit through an alternating current coupling element to provide the respective adjusted ramp generator signals.

11. The multiphase switching regulator circuit of claim 10, further comprising:
    a pulse width modulator circuit configured to receive a main loop control signal and the adjusted ramp generator signals.

12. The multiphase switching regulator circuit of claim 10, wherein the phase sense signals are filtered replica signals associated with a plurality of respective output stages of the multiphase switching regulator circuit.

13. The multiphase switching regulator circuit of claim 12, further comprising:
    a drive circuit comprising a plurality of respective drive stages associated with the respective output stages; and
    a plurality of respective replica circuits associated with the respective drive stages.

14. The multiphase switching regulator circuit of claim 13, wherein the respective replica circuits are a scaled down copy of the respective drive stages that drive respective inductors, the respective replica circuits being scaled down in terms of transistor size, and the respective replica circuits driving a low pass filter.

15. The multiphase switching regulator circuit of claim 13, wherein the respective replica circuits are each comprised of a first transistor and a second transistor in series.

16. An apparatus, comprising:
    a set of drivers configured to provide a set of phase currents;

a ramp generator circuit;

an adder configured to receive a set of error signals associated with the set of the phase currents and a ramp generator signal from the ramp generator circuit and provide a set of adjusted ramp generator signals; and a set of pulse width modulators configured to receive the set of adjusted ramp generator signals and provide a set of control signals to the set of the drivers, wherein the adder comprises a set of current sources configured to receive the set of the error signals, wherein set of current sources is used to generate a set of common mode voltage signals, and wherein the common mode voltage signals are added to the ramp generator signal generated by the ramp generator circuit through a coupling.

17. The apparatus of claim 16, further comprising:

a set of replica circuits provided with the set of drivers configured to provide a set of phase sense signals.

18. The apparatus of claim 17, wherein the set of the phase sense signals are replica signals associated with a set of output drivers and inductors associated with the set of the phase currents.

19. The apparatus of claim 16, wherein the set of pulse width modulators receives a voltage output signal from a main loop controller and provides the set of the control signals in response to a comparison of the set of the adjusted ramp generator signals and the voltage output signal.

20. The apparatus of claim 16, wherein the set of phase currents are provided through a set of inductors for providing a power signal for an integrated circuit.

* * * * *